United States Patent

Eveleigh et al.

(10) Patent No.: US 6,508,406 B1
(45) Date of Patent: Jan. 21, 2003

(54) FAIL-SAFE PROPORTIONAL MIXING VALVE

(76) Inventors: Robert Eveleigh, 506 W. 83rd Pl., Indianapolis, IN (US) 46260; Kevin Kline, 800 E. Henry Clay, Apt. 101, Whitefish Bay, WI (US) 53217

( * ) Notice: Subject to any disclaimer, the term of this patent is extended or adjusted under 35 U.S.C. 154(b) by 0 days.

(21) Appl. No.: 09/501,072

(22) Filed: Feb. 9, 2000

(Under 37 CFR 1.47)

Related U.S. Application Data

(63) Continuation of application No. 09/042,959, filed on Mar. 17, 1998, now Pat. No. 6,042,015.

(51) Int. Cl.⁷ .............................................. G05D 23/13
(52) U.S. Cl. ............................... 236/12.14; 236/DIG. 2
(58) Field of Search ..................... 236/DIG. 2, 12.14, 236/12.15; 251/217, 218; 138/43, 46

(56) References Cited

U.S. PATENT DOCUMENTS

| | | | |
|---|---|---|---|
| 2,326,096 A | * | 8/1943 | Dillman .................... 236/12.14 |
| 2,855,151 A | * | 10/1958 | Lesovsky ................. 236/12.14 |
| 2,895,676 A | * | 7/1959 | Kraft ....................... 236/12.14 |
| 2,910,242 A | * | 10/1959 | Freismuth et al. ........ 236/12.14 |
| 3,938,741 A | | 2/1976 | Allison |
| 4,299,354 A | | 11/1981 | Ketley |
| 4,475,684 A | * | 10/1984 | Garlick et al. ........... 236/12.14 |
| 4,480,784 A | | 11/1984 | Bennett |
| 4,883,225 A | | 11/1989 | Kitchens |
| 5,011,074 A | | 4/1991 | Kline |
| 5,203,496 A | | 4/1993 | Kline |
| 5,379,936 A | | 1/1995 | Kline |
| 5,647,530 A | * | 7/1997 | Lorch ...................... 236/12.14 |
| 5,647,531 A | | 7/1997 | Kline et al. |

FOREIGN PATENT DOCUMENTS

| | | | |
|---|---|---|---|
| GB | 417312 | * 10/1934 | .............. 236/12.14 |

* cited by examiner

*Primary Examiner*—William E. Tapolcai
(74) *Attorney, Agent, or Firm*—Maginot, Moore & Bowman, LLP

(57) ABSTRACT

A fail-safe proportional mixing valve is provided that tempers a hot fluid supply by proportional flow from a hot fluid inlet and a cold fluid inlet. The valve includes a fail-safe mechanism disposed within the body of the valve to isolate flow from the hot fluid inlet in the event the temperature of the mixed fluid exceeds a predetermined set point. The valve also includes a check valve in the fluid inlets to prevent backflow in case of failure of a fluid supply. In a further aspect, the cold fluid inlet includes an adjustment set screw to adjust the cold fluid flow into the mixing valve, thereby adjusting the maximum mixed fluid temperature that can be discharged from the valve assembly.

14 Claims, 5 Drawing Sheets

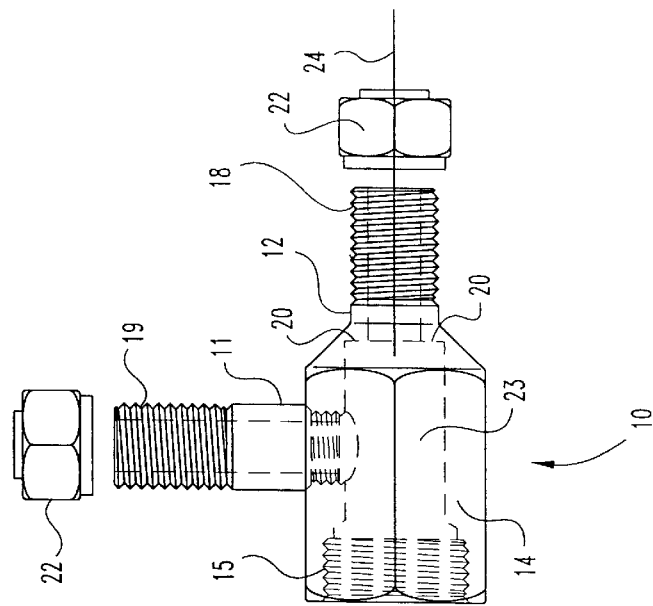
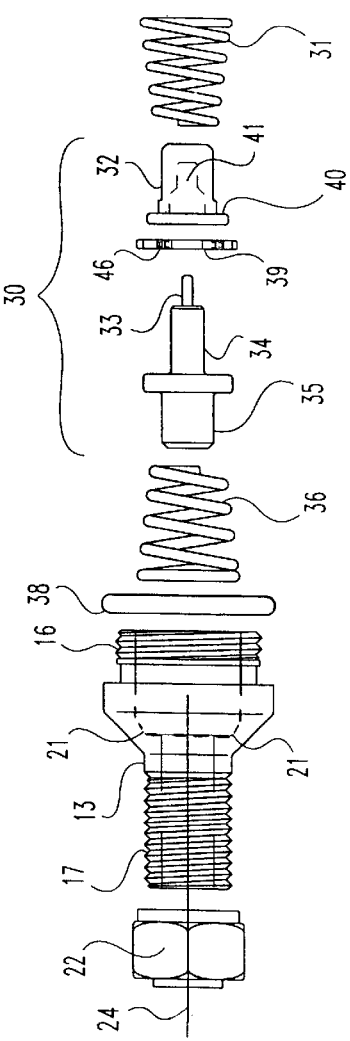
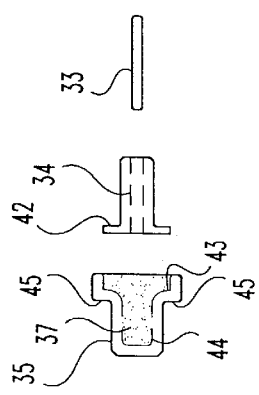
Fig. 2
Fig. 3

FAIL-SAFE PROPORTIONAL MIXING VALVE

This application is a continuation of prior application Ser. No. 09/042,959, filed on Mar. 17, 1998, now U.S. Pat. No. 6,042,015.

BACKGROUND OF THE INVENTION

This invention relates to a proportional mixing valve for mixing a hot and a cold fluid that includes a fail-safe mechanism for shutting off hot fluid flow when the temperature of the fluid exiting the valve exceeds a predetermined set point.

Mixing valves and fail-safe mechanisms in water and other fluid supply systems are well known. They are typically employed to control the maximum fluid temperature to a predetermined set point, which is usually a temperature, that is safe for human skin upon prolonged exposure. For example, hot water from water heaters typically has a temperature of 140° F. to 160° F. with a maximum temperature of 180° F. At 140° F., a child can be scalded if the skin is exposed for one second. However, if the water temperature is reduced to 120° F. continuous exposure for five minutes is required to scald the skin.

In domestic applications, and in many commercial uses, it is desirous that the maximum hot water temperature from a shower, tub or basin outlets be set at a level that prevents serious burning or scalding of the skin. Oftentimes, a water faucet is allowed to run in a full flow hot water condition to purge cold water resting in the supply line to the faucet. A child or other unsuspecting person would be scalded if they were to contact the water once the cold water is purged. Thus, mixing valves are often used in the supply piping to basin, tub, or shower faucets in order to temper the hot water supply. Tempering the hot water supply at these point-of-use locations allows higher temperature water to continue to be produced by a water heater and used at locations where it is necessary, such as the washing machine or dishwasher.

While mixing valves temper the hot water supply under normal operating conditions, a fail-safe mechanism is necessary to isolate the flow of hot water when the supply of cold water fails. Serious injury could result to a child if, for instance, the cold water supply fails while the child is taking a shower, causing the water temperature to increase to its maximum supply temperature. Thus, fail-safe mechanisms can provide an added protective feature when combined with a mixing valve that is used to temper hot water.

Previous patents of mixing valves and fail-safe devices for hot fluid have employed various techniques. For example, U.S. Pat. No. 4,299,354 to Ketley discloses a thermally operated mixing valve. The temperature of the fluid is controlled via a thermally responsive control member that varies the flow of the cold fluid as needed to temper the hot water to the desired preset temperature. If the cold water supply fails or is interrupted, the control member reacts to either restrict or nearly isolate hot water flow. The valve is typically located at the point-of-use of the fluid supply since the user must manually operate the control member with an actuator to obtain fluid at a temperature less than the preset maximum temperature.

Another type of device is disclosed in U.S. Pat. No. 4,480,784 to Bennett and U.S. Pat. No. 3,938,741 to Allison. Each of these patents discloses safety devices for isolating water flow to an outlet when the water temperature exceeds a predetermined set point. Both devices are employed in the apparatus, which discharges the water, such as a showerhead. The Bennett devices employs a thermostatic cup that expands to constrict flow, but allows the hot water to drip so that the device continues sensing the water temperature. The Allison device includes a temperature responsive mechanism with a valve attached to one end that isolates flow when the water temperature exceeds a given operating temperature.

The foregoing prior art suffers from several drawbacks. For instance, the mixing valve device must be located near where the flow of fluid is controlled by the user. The devices also rely on a modulating control member to temper the hot water supply whose setting is controlled by the user's manipulation of an actuator. In some valves, the fail-safe devices are required to be on or near a water supply system is required to temper the hot water supply temperature.

Another desirable feature absent from these prior systems is the ability to adjust the fluid temperature at the point-of-use outlet. Different maximum temperatures may be desirable at different discharge outlets, such as a kitchen sink versus a workroom tub.

What is needed, therefore, is a mixing valve assembly, which does not require modulating elements in order to temper the hot fluid supply. What is also needed is a mixing valve assembly, which includes a fail-safe mechanism that allows the valve to be used in virtually any location in a domestic or commercial water supply or fluid supply system.

SUMMARY OF THE INVENTION

A proportional flow mixing valve assembly is provided that allows a hot fluid supply to be tempered with a predetermined proportional flow of cold fluid based on the relative inlet diameters of the hot and cold fluid supplies. The assembly also includes a fail-safe mechanism, which isolates the hot fluid flow in case of interruption of the cold fluid supply. The assembly may also be provided with a check valve to prevent backflow of the hot fluid supply into the cold fluid supply in the event of its failure or interruption.

In particular, the assembly can mix a hot fluid with a cold fluid to achieve a mixed fluid that has a temperature below a specified threshold. The fluids are proportionately mixed in a mixing chamber in order to temper the hot fluid temperature. The desired temperature is obtained based on the sizing of relative inlet diameters allowing proportional flow from the hot and cold fluid inlets. When the cold fluid supply is interrupted or fails, a failure responsive means isolates the hot fluid flow when the mixed fluid temperature in the mixing chamber exceeds a predetermined set point temperature. The set point temperature is typically set such that the mixed fluid temperature will be safe with prolonged exposure to the human skin.

The failure response means includes a fail-safe mechanism, which is biased in an open position. The fail-safe mechanism can include a housing containing a thermally responsive medium, which volumetrically reacts to changes in the fluid temperature in the mixing chamber. The thermally responsive medium is engaged to a plug, which moves toward the hot fluid inlet as the fluid temperature increases. When the fluid temperature exceeds a predetermined threshold, the plug isolates the hot fluid supply. The valve assembly may also include a check valve in the cold fluid inlet to prevent backflow or siphoning upon failure or interruption of the hot fluid supply.

In a further embodiment, a flow control member is interposed at one of the fluid inlets, such as the cold inlet. The flow control member is adjustable to permit adjustment of the limit temperature of the mixed fluid discharged from the valve. the adjustable flow control member can include a stepped diameter screw that is advanced across the inlet fluid flow to reduce the flow in relation to the stepped diameter. This adjustable flow control member does not interfere with the fail-safe functioning of the valve, but instead allows the user to specifically determine the maximum mixed fluid temperature at a particular fixture or faucet.

One object of the present invention is to provide a mixing valve in which the relative diameters of the fluid inlets are proportionately sized to control the mixed fluid temperature below a safe threshold temperature. Another object of the present invention is to provide a fail-safe assembly that isolates hot fluid flow then the mixed fluid temperature exceeds the threshold level due to, for instance, failure of the cold fluid supply.

It is yet another object of the present invention to provide a fail-safe proportional mixing valve with a means for preventing backflow into a failed or low pressure fluid supply line from the intact supply line. A further object is accomplished by features that permit adjustment of the maximum mixed fluid temperature discharged from the mixing valve assembly, without sacrificing the fail-safe features of the assembly.

These and other objects of the present invention will become more apparent from the following description of the preferred embodiment and the accompanying figures.

BRIEF DESCRIPTION OF THE DRAWINGS

FIG. 2 is an exploded side elevational view of the proportional-mixing valve of FIG. 1.

FIG. 3 is an exploded view of a portion of the fail-safe mechanism illustrated in FIG. 2.

DESCRIPTION OF THE PREFERRED EMBODIMENT

Figure 1:
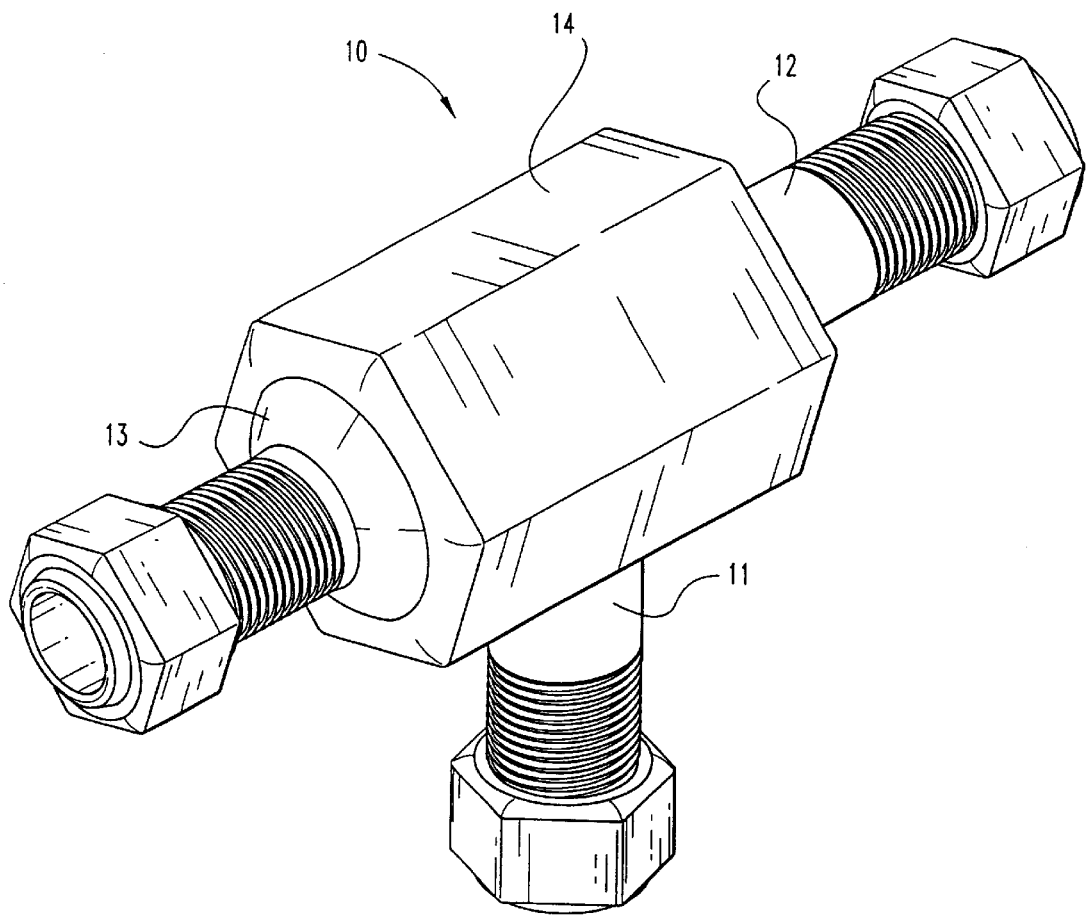
FIG. 1 is a perspective view of one embodiment of a fail-safe proportional mixing valve in accordance with the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In accordance with the present invention, a device for proportionally mixing hot and cold fluid, which includes a fail-safe mechanism, is shown in FIGS. 1–7. Referring to FIG. 1, the mixing valve 10 includes a cold fluid inlet 11 for supplying a cold fluid, a hot fluid inlet 12 for supplying a hot fluid, and a mixed fluid outlet 13 for discharging a tempered fluid. Inlets 11 and 12 are connected to valve body 14. Valve body 14 defines a cavity 23 (FIG. 2) which serves as mixing chamber. The inlets 11 and 12 communicate with cavity 23 in order for the hot and cold fluids to mix in cavity 23, creating the tempered fluid. Mixed fluid outlet 13 is also in communication with cavity 23 and allows the tempered fluid to exit cavity 23.

Referring now to FIG. 2, cold fluid inlet 11 and hot fluid inlet 12 are sized to allow proportional flow of hot and cold fluid to temper the water in cavity 23 before it exits through mixed fluid outlet 13. In a preferred embodiment, the mixed fluid has a temperature of about 120° F., which will prevent scalding of the skin upon short-term exposure (less than 5 minutes). Alternative embodiments contemplate other outlet fluid temperatures depending on the intended use of the mixed fluid. In some configurations, the outlet temperature can be controlled to a small degree by adjusting the cold water flow through inlet 11. In these configurations, a needle valve can be connected at the cold inlet 11 to control the cold flow into the valve body 14.

One specific embodiment of the mixing valve assembly will now be described. In one typical domestic use, outlet 13 is sized to allow a flow of three gallons of water per minute. Typically, the cold fluid supply is about 55° F., and the hot water supply temperature from domestic water is about 140° F. The hot and cold fluid inlets are sized to allow a flow of hot water and a flow of cold water that will temper the mixed water to about 120° F. In the specific embodiment, hot fluid inlet 12 has a diameter of 0.23 inches, and cold fluid inlet 11 has a diameter of 0.13 inches. The ratio of hot fluid flow to cold fluid flow is about 3.1 to 1, resulting in a mixed fluid temperature of less than 120° F.

Figure 4:
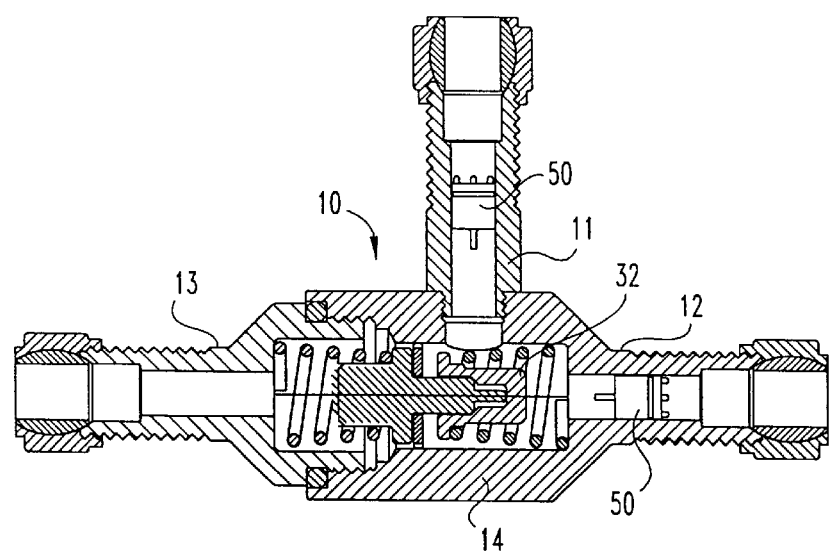
FIG. 4 is a section view of the proportional mixing valve of FIG. 1 illustrating the fail-safe mechanism in a closed position.

Cavity 23 defines a longitudinal axis 24, which extends through the center of hot fluid inlet 11. Fail-safe mechanism 30 is positioned within cavity 23 and centered along longitudinal axis 24. Mixing device 10 includes a first spring 31 and centered along longitudinal axis 24. Mixing device 10 includes a first spring 31 and a second spring 36 disposed within cavity 23. Springs 31 and 36 bias fail-safe mechanism 30 to an open position, as shown in FIG. 4. First spring 31 contacts a mixing chamber bearing surface 20 and a plug flange 40. Second spring 36 contacts an outlet bearing surface 21 and a thermostat-housing flange 45. When mixing outlet 13 is threaded or attached to valve body 14, first spring 31 and second spring 36 compress and the opposing force from each spring ensures that fail-safe mechanism 30 is aligned along longitudinal axis 24 within cavity 23. A washer 39 may also be included to maintain the positioning of fail-safe mechanism 30 along longitudinal axis 24. Washer 39 includes prongs 46 spaced about its circumference, which project outward to bear on the side walls of cavity 23. Prongs 46 also allow fluid flow around washer 39.

Referring back to FIG. 2, fail-safe mechanism 30 includes a plug 32, a piston 33 which includes a first end and a second end, a sleeve 34 and a thermostat housing 35. Plug 32 defines a recess 41, which engages one end of piston 33. The opposite end of piston 33 is positioned within sleeve 34. As shown in FIG. 3, sleeve 34 includes sleeve flanges 42 fit within recess 43. Thermostat cavity 37 includes an amount of thermal expansion material 37. In one embodiment, the thermal expansion material 37 includes a thermally responsive wax, which volumetrically changes with changes in temperature. In another embodiment, the thermal expansion material 37 includes a memory metal, which expands and contracts with temperature changes. In any event, the end of piston 33 disposed within sleeve 34 is in contact with the thermal expansion material disposed within thermostat cavity 37.

Valve body 14 includes mixing chamber threads 15, which threadedly engage first outlet threads 16. Fail-safe mechanism 30 and springs 31 and 36 are positioned with cavity 23 prior to assembly of outlet 13. Outlet 13 is threaded onto valve body 14, compressing springs 31 and 36 as it is threaded into place. Springs 31 and 36 are sized so they are neither fully compressed nor fully relaxed when the mixing device 10 is assembled, thus allowing fail-safe mechanism 30 to expand and contract. An O-ring gasket 38 is provided to seal mixed outlet 13 and valve body 14 when assembled.

Figure 5:
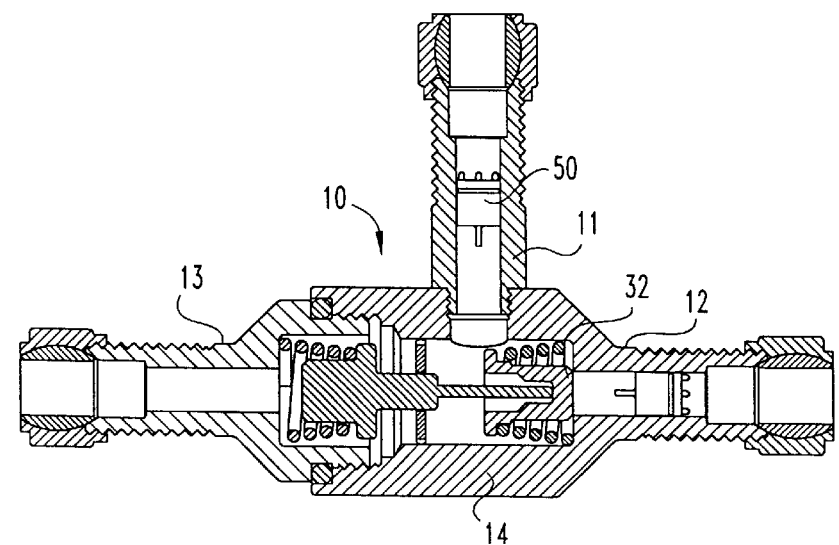
FIG. 5 is a section view of the proportional mixing valve of FIG. 1 illustrating the fail-safe mechanism in a closed position.

Referring now to FIG. 5, plug 31 prevents flow from hot fluid inlet 12 when the mixed fluid temperature in cavity 23 exceeds a pre-determined threshold temperature. As the temperature of the mixed fluid increases, thermal expansion material 37 in thermostat housing 35 expands in sleeve 34. This expansion causes piston 33 move plug 32 towards hot fluid inlet 12, lengthening fail-safe mechanism 30 and further compressing first spring 31 and second spring 36. When the temperature of the fluid exceeds the set point temperature, plug 32 engages hot fluid inlet 12 and prevents further flow of hot fluid.

Valve body 14, inlets 11 and 12 and outlet 13 are preferably molded from a cast gunmetal and cavity 23 is machined to the required dimensions as is known in the art. The components of the fail-safe mechanism 30 are preferably made of brass to prevent rust and corrosion from affecting their performance. Springs 31 and 36 are preferably made of stainless steel. However, other materials know in the art, which can withstand the temperature differentials, and meet the performance requirements described above are also contemplated.

Hot and cold fluid inlets 11 and 12 may include inlet threads 18, and mixed outlet 13 may include second outlet threads 17. These threads may be threadedly engaged to compression couplings 22, which are used to connect mixing valve 10 to a fluid supply system as is known in the art. Alternatively, flared ends or beveled ends may replace the threads and couplings on the inlets and outlet so the valve may be welded or soldered onto adjacent piping of the water supply system.

Figure 6:
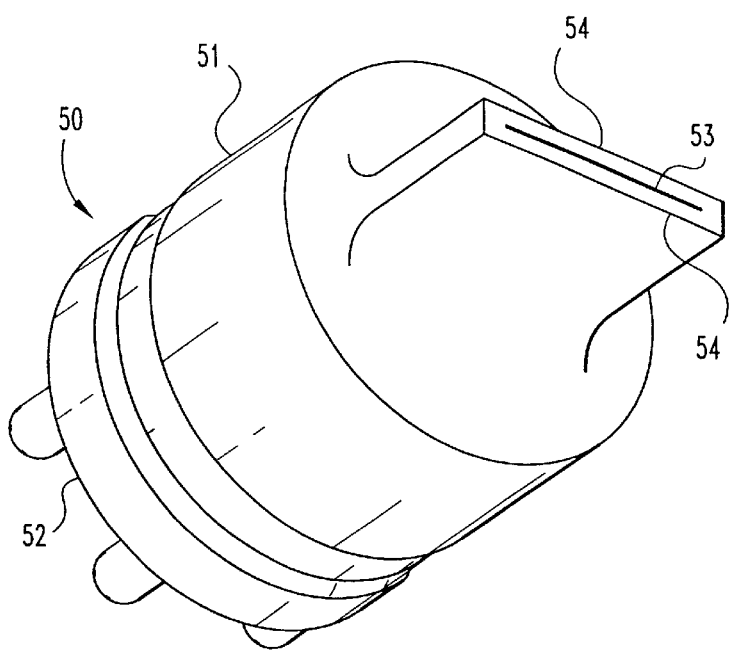
FIG. 6 is a perspective view of the valve employed in the fluid inlets as shown in FIGS. 4 and 5.

Check valves 50, as shown in FIGS. 4 and 5, may be installed in each fluid inlet 11 and 12 to prevent backflow in event of a hot or cold fluid supply disruption. Referring now to FIG. 6, check valve 50 includes a cylindrical body 51, a first opening 52 on one end defined by cylindrical body 51, and flaps 54 extending from the opposite end of cylindrical body 51. Flaps 54 are connected along the two opposite edges extending from body 51 in order to define a second opening 53. When fluid is flowing through first opening 52, flaps 54 are forced apart by the fluid pressure to enlarge second opening 53. When there is no fluid flow through first opening 52, flaps 54 some together and prevent any fluid from the opposite direction from flowing into second opening 53, thus preventing backflow from the hot water supply into the cold water supply.

Figure 7:
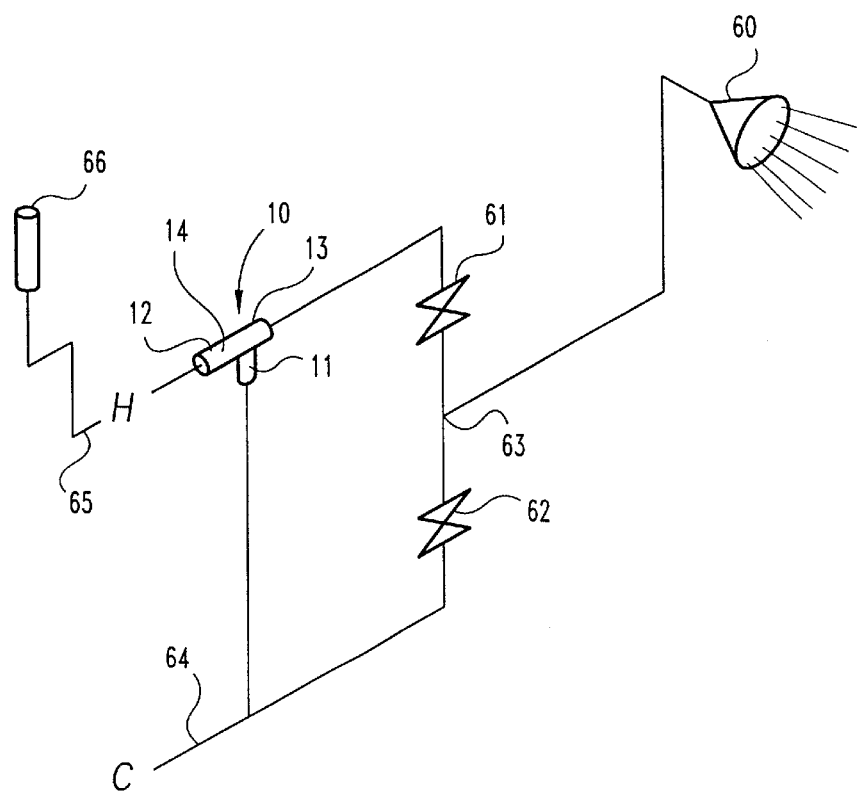
FIG. 7 is an isometric view of a piping system illustrating one example of use of the proportional mixing valve of FIG. 1.
Figure 8:
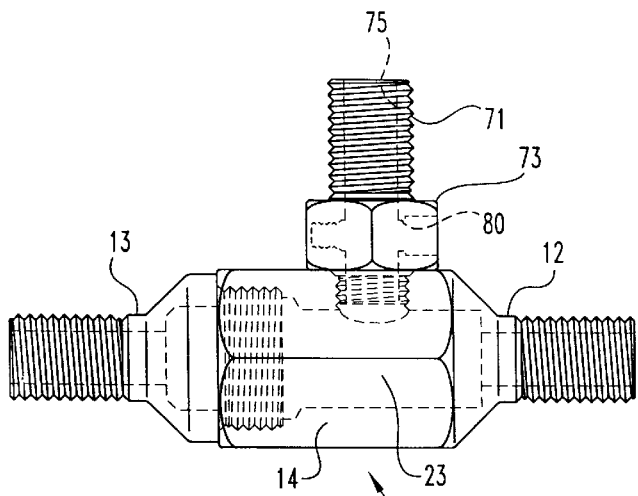
FIG. 8 is a side elevational view of a fail-safe mixing valve similar to the valve in FIGS. 1–6 with the additional ability to control the maximum mixed outlet temperature for the valve.
Figure 9:
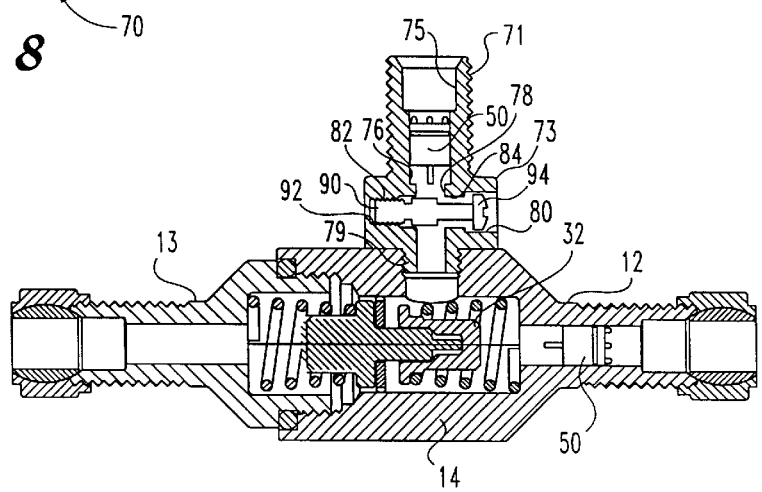
FIG. 9 is a side cross-sectional view of the mixing valve shown in FIG. 8.

FIG. 7 illustrates the use of the preferred embodiment-mixing valve 10 in a typical domestic water supply system. Shower 60 is connected to a cold water system 64 and a hot water system 65. Hot water system 65 is connected to a water heater 66, which heats water supplied from a well or water system to about 140–180° F. At this temperature, the hot water would cause a full depth scald of a child's skin in one second. Mixing valve 10 is placed in the hot water system with hot fluid inlet 12 receiving water from water heater 66. Cold fluid inlet 11 is connected to cold water system 64. The hot water and cold water mix in valve body 14. The cold water inlet 11 is sized such that the cold water tempers the hot water, preferably to a temperature of about 120° F. At this temperature, a child's skin would have to be in contact with the water for about five minutes to be scalded. The tempered water exits the mixing valve 10 through mixed fluid outlet 13. The tempered water from hot can again be proportioned by user control of a hot water valve 61 and a cold water valve 62 to mix at a junction 63 prior to exiting at shower 60.

Oftentimes before using a shower or tub, it is necessary to purge cold water from a water supply system. Opening hot water valve 61 while cold water valve 62 remains closed does this. Once the cold water is purged, only water from hot water supply 65 is coming out of shower 60. If the hot water temperature were not tempered, its temperature exiting from shower 60 would be 140–180° F. A person or child touching the water could be seriously burned if cold water supply 64 was inadvertently not opened. The device 10 tempers the hot water supply 65 to a safe temperature of below 120° F. by allowing a continuous mixing of cold water supply 64 in valve body 14, even though only hot water valve 61 opened by the user.

Another advantage of the present invention is recognized upon failure of cold water supply 64. The fail-safe mechanism 30, shown in FIG. 5, will prevent flow from the hot water supply line 65 when the temperature of the water in valve body 14 exceeds a predetermined threshold temperature. Preferably, this threshold is about 120° F. If cold water supply 64 were to fail due to, for instance, a main burst, then the water from water heater 66. Fail-safe mechanism 30 will then react to isolate hot water supply 64 from shower 60. An alternative embodiment may also include check valve 50 in cold fluid inlet 11. This prevents backflow from hot water system 65 into cold water system 64 and the possibility of injury occurring to a person using cold water system 64.

A further embodiment of the invention is depicted in FIGS. 8–11. In this embodiment, a mixing valve assembly 70 is configured similar to the valve assembly 10 previously described. The valve assembly 70 includes a hot inlet 12 and a mixed fluid outlet 13. A valve body 14 includes a cavity 23 within which hot fluid from inlet 12 and cold fluid are mixed. In this embodiment, cold fluid is supplied through cold inlet 71., which is modified relative to the cold inlet 11 of the embodiment of FIG. 1. Specifically, the cold inlet 71 includes an enlarged portion 73 that is preferably configured to include an external hex for engagement with a driving wrench. The wrench can be used to thread the cold inlet 71 into the valve body 14 as described above for cold inlet 11.

The cold inlet 71 defines a cold inlet bore 75 that communicates with the mixing chamber cavity 23 when the cold inlet is engaged to the valve body 14. As shown most clearly in FIG. 9, the cold inlet bore 75 has a reduced diameter portion 76 within which the check valve 50 resides. The cold inlet bore 75 steps down to a further reduced diameter portion 78 that preferably continues to the engagement end 79 of the cold inlet 71.

In a further feature of the mixing valve assembly 70, the enlarged portion 73 defines a blind adjustment bore 80 extending transversely to and intersecting the cold inlet bore 75. The adjustment bore 80 includes a threaded portion 82 at its blind end and an intermediate reduced diameter segment 84 at the intersection with the cold inlet bore 75. A flow control member 90 extends into the adjustment bore 80. In the preferred embodiment, the flow control member is an adjustment screw 90 that has a threaded end 92 for engagement with the threaded portion 82 of the adjustment bore 80. The adjustment screw 90 also includes an enlarged driving head 94 at its opposite end that is configured to receive a driving tool, such as a screwdriver. The driving head 94 has a diameter slightly smaller than the diameter of the adjustment bore 80 at its open end, but larger than the diameter of the intermediate segment 84.

Figure 10:
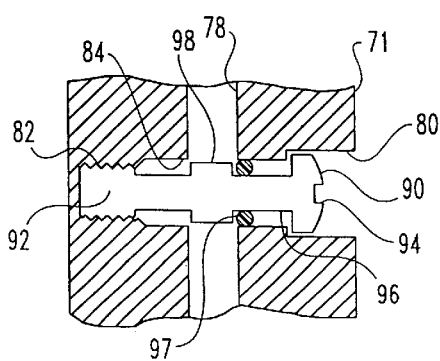
FIG. 10 is an enlarged partial cross-sectional view of the mixing valve of FIGS. 8–9 with the flow control member in a first position.
Figure 11:
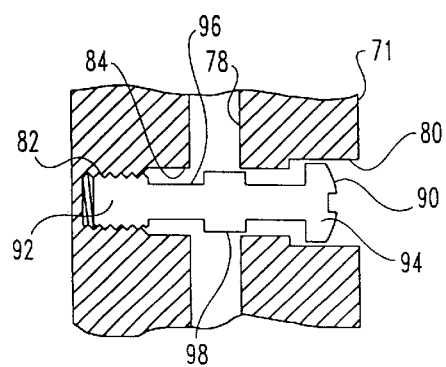
FIG. 11 is an enlarged partial cross-sectional view of the mixing valve of FIGS. 8–9 with the flow control member in a first position.

Further details of the adjustment screw 90 can be discerned from FIGS. 10–11. The adjustment screw includes an elongated shaft portion 96 that has an outer diameter less than the intermediate portion 84 of the adjustment bore 80 so that the adjustment screw 90 can move axially along the bore 80 and particularly intermediate portion 84. This axial movement is accomplished by threading the adjustment screw 90 into and out of the threaded portion 82 of the adjustment bore 80. Preferably, the valve assembly 70 includes a seal 97 between the shaft 96 and the adjustment bore portion 84 to prevent fluid leakage through the adjustment bore 80.

The adjustment screw 90 includes an increased diameter land 98 intermediate along the length of the shaft portion 96. The land 98 has a diameter slightly smaller than the diameter of the intermediate portion 84 of the adjustment bore 80. The width of the land 98 is calibrated to be slightly less than the diameter of the reduced diameter portion 78 of the cold inlet bore 75.

The adjustment screw 90 can be adjusted between the two positions shown in FIG. 10 and FIG. 11. In the first position, the land 98 is completely interposed within the cold fluid inlet bore and particularly the reduced diameter portion 78. When the land 98 is so positioned, the cold fluid flow is substantially interrupted. Depending upon the width of the land relative to the diameter of the portion 78, the cold flow can be reduced to a trickle, although preferably the components are sized so that a 3 g.p.m. cold fluid flow rate is reduced to 1 g.p.m.

In the second position shown in FIG. 11, the land 98 is substantially moved out of the cold inlet bore flow path so the standard cold flow is maintained. It is contemplated that the length of the adjustment screw 90 can be determined with respect to the length of the adjustment bore 80 so that the overall stroke of the intermediate land 98 can be calibrated. Moreover, the land 98 itself can have various configurations to control the fluid flow around or even through the land 98. For example, the land 98 or shaft 96 can have different diameter portions to provide incremental flow control. In other words, the reduction in flow through one of the inlets is in proportion to the diameter of the portion of the land 98 or shaft 96 that intersects the fluid flow. These design modifications still retain the primary function of the adjustment screw 90 of providing means for adjusting the limiting temperature of the mixing valve 70. As discussed in connection with the previous mixing valve assembly 10, the mixing valve receives hot and cold water at relatively constant temperatures. The fail-safe components of the valve are calibrated to a particular temperature at which hot flow is reduced to a trickle upon failure of the cold fluid inlet. The fail-safe components do not provide any means within the valve assembly for adjusting the maximum mixed fluid temperature discharged from the valve assembly.

The adjustment screw 90 and the cold fluid inlet 71 of the present embodiment permit adjustment of the cold fluid flow into the mixing chamber 23, and therefor adjustment of the maximum mixed temperature that the valve assembly 70 can achieve. While in the illustrated embodiment the flow control member/adjustment screw is disposed only within the cold fluid inlet, the flow control member can be utilized within the hot fluid inlet, either alone or in conjunction with a similar member in the cold fluid inlet. The flow control member 90 can be utilized in the inlet having the higher input flow rate, which is typically the cold fluid inlet, to help balance the hot/cold flow rates.

This adjustment feature greatly enhances the utility of the mixing valve of the present invention. Specifically, certain household faucets may have different water temperature needs. For example, the temperature requirements for a shower may differ from as at the kitchen sink, which may differ from the requirements at a workroom basin. Some household usages may require water that has a lower limiting temperature, such as a child's bathroom sink, to prevent scalding of a child washing his/her hands. On the other hand, a kitchen sink may require a higher limiting temperature for hand washing of dishes. The adjustment features of the mixing valve 70 address these variable temperature requirements in a single valve without compromising the fail-safe features of the valve. Separate mixing valves 70 can be placed at different locations throughout the house, each valve being individually adjusted so that the maximum water discharge temperature can be matched with the usage at that location.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A fail-safe proportional mixing valve assembly, comprising:

a valve body defining a mixing chamber;

a cold fluid inlet in communication with said mixing chamber and connected to a supply of a first flow of a cold fluid;

a hot fluid inlet in communication with said mixing chamber and connected to a supply of a second flow of a hot fluid;

a fluid outlet in communication with said mixing chamber for discharge of fluid therefrom, wherein said cold fluid inlet and said hot fluid inlet are proportionately sized to temper the hot fluid within said mixing chamber below a predetermined set point temperature; and failure responsive means for substantially restricting said second flow of hot fluid into said mixing chamber upon a failure of said first flow of cold fluid, said failure responsive means being at least partially disposed within said mixing chamber and including;

a thermal expansion member disposed in said mixing chamber that volumetrically changes in proportion to the fluid temperature in the mixing chamber;

a plug disposed between said hot fluid inlet and said mixing chamber and engaged to said thermal expansion member to move with said member from an open position which allows substantially full flow from said hot fluid inlet into said mixing chamber, to a closed position in which said plug substantially restricts flow from said hot fluid inlet; and biasing means for biasing said plug to said open position when the temperature of fluid within said mixing chamber is below said set point.

2. The mixing assembly according to claim 1, further comprising a check valve positioned within said cold fluid inlet to prevent backflow of hot fluid from said mixing chamber into said cold fluid inlet upon interruption of the first flow of cold fluid.

3. The mixing assembly according to claim 1, wherein said failure responsive means includes a cylindrical housing defining a hollow interior, with said thermal expansion member being disposed within said housing in communication with said hollow interior.

4. The mixing assembly according to claim 1, wherein said thermal expansion member includes a thermal responsive wax.

5. The mixing valve assembly according to claim 1, wherein said biasing means includes a first spring disposed between said hotter fluid inlet and said plug to bias said plug away from said closed position.

6. The mixing valve assembly according to claim 5, wherein said biasing means includes a second spring operating on said plug and opposing said first spring, wherein said first spring and said second spring are arranged to support said plug within said hollow interior of said mixing chamber and to maintain alignment of said plug with said hot fluid inlet.

7. The mixing valve assembly according to claim 1, wherein said cold fluid inlet defines a cold inlet bore with a first diameter and said hot fluid inlet defines a hot inlet bore with a second diameter greater than said first diameter.

8. The mixing valve assembly according to claim 7, wherein said second diameter is more than 1.5 times greater than said first diameter.

9. The mixing valve assembly according to claim 8, wherein said first diameter is about 0.13 inches and said second diameter is about 0.23 inches.

10. The fail-safe mixing valve assembly according to claim 1, further comprising:

a flow control member disposed within at least one inlet of said cold fluid inlet or said hot fluid inlet, said flow control member including an adjustment screw having a stepped diameter shaft, said adjustment screw being adjustably disposed within said one inlet to introduce portions of said stepped diameter shaft into the corresponding first flow or second flow through said one inlet to reduce said corresponding flow in proportion to the diameter of said portions of said shaft.

11. The fail-safe mixing valve assembly according to claim 10, wherein said one inlet includes:

an inlet bore in communication with said mixing chamber;

an enlarged portion defining an adjustment bore therethrough intersecting said inlet bore, said adjustment bore having a threaded portion for threaded engagement with said adjustment screw.

12. The fail-safe mixing valve assembly according to claim 11, wherein:

said inlet bore has a diameter at the intersection with said adjustment bore; and said stepped diameter shaft of said adjustment screw includes an adjustment land having a dimension along the length of said shaft that is slightly less than said diameter of said inlet bore.

13. The fail-safe mixing valve assembly according to claim 12, wherein:

said adjustment bore has an adjustment diameter at the intersection with said inlet bore; and said adjustment land has an outer diameter that is slightly less than said adjustment diameter of said adjustment bore.

14. The fail-safe mixing valve assembly according to claim 13, wherein said threaded portion of said adjustment bore is configured to permit threaded adjustment of the adjustment screw within the adjustment bore from a first position in which said adjustment land is entirely disposed within said diameter of said inlet bore at the intersection, and a second position in which said adjustment land is disposed substantially outside said diameter of said inlet bore at the intersection.

* * * * *